United States Patent
Bell

(10) Patent No.: US 11,197,331 B2
(45) Date of Patent: Dec. 7, 2021

(54) ZERO-ROUND-TRIP-TIME CONNECTIVITY OVER THE WIDER AREA NETWORK

(71) Applicant: Apple Inc., Cupertino, CA (US)

(72) Inventor: Christopher M. Bell, San Jose, CA (US)

(73) Assignee: Apple Inc., Cupertino, CA (US)

( * ) Notice: Subject to any disclaimer, the term of this patent is extended or adjusted under 35 U.S.C. 154(b) by 392 days.

(21) Appl. No.: 15/179,401

(22) Filed: Jun. 10, 2016

(65) Prior Publication Data

US 2017/0359843 A1 Dec. 14, 2017

(51) Int. Cl.
| | | |
|---|---|---|
| H04W 4/00 | (2018.01) | |
| H04W 76/11 | (2018.01) | |
| H04W 40/02 | (2009.01) | |
| H04W 28/02 | (2009.01) | |
| H04W 12/062 | (2021.01) | |
| G06F 21/30 | (2013.01) | |

(Continued)

(52) U.S. Cl.
CPC .......... *H04W 76/11* (2018.02); *H04W 12/062* (2021.01); *H04W 28/0236* (2013.01); *H04W 40/02* (2013.01); *G06F 21/30* (2013.01); *G06F 21/62* (2013.01); *H04W 12/69* (2021.01)

(58) Field of Classification Search
None
See application file for complete search history.

(56) References Cited

U.S. PATENT DOCUMENTS

| | | |
|---|---|---|
| 7,424,267 B2 | 9/2008 | Eisenbach |
| 7,500,262 B1 * | 3/2009 | Sanin ..................... H04L 9/3234 726/2 |

(Continued)

FOREIGN PATENT DOCUMENTS

| | | |
|---|---|---|
| EP | 2615746 | 7/2013 |
| WO | 2012044395 | 4/2012 |
| WO | 2014084707 | 6/2014 |

OTHER PUBLICATIONS

International Search Report and Written Opinion for International Application No. PCT/US2016/027927, dated Jul. 4, 2016, pp. 1-15.

(Continued)

*Primary Examiner* — Bob A Phunkulh
(74) *Attorney, Agent, or Firm* — Kowert, Hood, Munyon, Rankin & Goetzel, P.C.

(57) ABSTRACT

A communication device (UE) conducting wired and/or wireless communications may issue service requests using zero-round-trip-time (zero-RTT) connectivity. The UE may obtain, prior to initiating an application, an address corresponding to a service and a security credential for use in accessing the service. The UE may receive, after initiating the application, an instruction to issue a service request, and generate the service request that may include a service identifier corresponding to the service, the address corresponding to the service, and the security credential for use in accessing the service. The UE may then transmit the service request to an edge server associated with the service. The edge server may route the service according to the service identifier. Multiple data centers/servers may advertise their services to the edge server associated with the service, facilitating fast routing of the service request by the edge server associated with the service.

20 Claims, 11 Drawing Sheets

(51) Int. Cl.
*H04W 12/69* (2021.01)
*G06F 21/62* (2013.01)

(56) References Cited

U.S. PATENT DOCUMENTS

| | | | |
|---|---|---|---|
| 7,912,020 B2 | 3/2011 | Khasawneh et al. | |
| 8,769,612 B2 | 7/2014 | Ganapathy | |
| 8,856,869 B1* | 10/2014 | Brinskelle | G06F 21/6218 726/2 |
| 9,166,862 B1* | 10/2015 | Davis | H04L 67/1097 |
| 9,231,951 B2 | 1/2016 | Roskind | |
| 9,390,052 B1* | 7/2016 | Parakh | H04L 67/2842 |
| 9,621,399 B1* | 4/2017 | Parakh | H04L 29/06047 |
| 9,780,952 B1* | 10/2017 | Behm | H04L 63/08 |
| 9,912,486 B1* | 3/2018 | Sharifi Mehr | H04L 9/3268 |
| 9,913,079 B2 | 3/2018 | Srivatsa | |
| 9,973,547 B1* | 5/2018 | Simms | H04L 65/1069 |
| 10,298,404 B1* | 5/2019 | Behm | H04L 9/3263 |
| 2002/0198937 A1* | 12/2002 | Diwan | G06F 17/30899 709/203 |
| 2003/0005152 A1* | 1/2003 | Diwan | G06F 17/30899 709/239 |
| 2005/0071481 A1 | 3/2005 | Danieli | |
| 2006/0294366 A1* | 12/2006 | Nadalin | H04L 9/3265 713/156 |
| 2007/0162752 A1* | 7/2007 | Baliga | G06F 21/606 713/169 |
| 2008/0134311 A1* | 6/2008 | Medvinsky | H04L 29/06965 726/7 |
| 2008/0178010 A1* | 7/2008 | Vaterlaus | H04L 67/16 713/189 |
| 2009/0081999 A1 | 3/2009 | Khasawneh et al. | |
| 2009/0259838 A1* | 10/2009 | Lin | H04L 9/3271 713/150 |
| 2009/0328172 A1* | 12/2009 | Das | H04L 67/1027 726/7 |
| 2010/0095121 A1* | 4/2010 | Shetty | H04L 9/3242 713/170 |
| 2010/0191852 A1* | 7/2010 | Black | G06Q 10/06 709/225 |
| 2010/0297983 A1* | 11/2010 | Aarni | H04M 1/66 455/411 |
| 2011/0107225 A1* | 5/2011 | Sukanen | H04L 67/02 715/736 |
| 2011/0107431 A1* | 5/2011 | Sukanen | G06F 21/42 726/27 |
| 2011/0239281 A1* | 9/2011 | Sovio | H04L 63/0815 726/5 |
| 2012/0167185 A1* | 6/2012 | Menezes | H04L 63/0815 726/5 |
| 2012/0322376 A1 | 12/2012 | Couse | |
| 2013/0072119 A1 | 3/2013 | Park | |
| 2013/0227279 A1* | 8/2013 | Quinlan | G06F 21/445 713/165 |
| 2013/0227280 A1* | 8/2013 | Quinlan | H04L 9/08 713/165 |
| 2013/0227287 A1* | 8/2013 | Quinlan | H04W 12/082 713/168 |
| 2013/0232554 A1* | 9/2013 | Campagna | H04L 63/08 726/4 |
| 2013/0246206 A1* | 9/2013 | Huang | H04W 4/001 705/26.1 |
| 2013/0269009 A1* | 10/2013 | Fang | H04L 63/083 726/6 |
| 2013/0288604 A1 | 10/2013 | Chang | |
| 2013/0331063 A1* | 12/2013 | Cormier | H04L 63/0272 455/411 |
| 2013/0346576 A1* | 12/2013 | Huang | H04L 45/745 709/223 |
| 2014/0013109 A1* | 1/2014 | Yin | H04W 12/0608 713/156 |
| 2014/0096199 A1* | 4/2014 | Dave | H04L 67/10 726/4 |
| 2014/0149552 A1* | 5/2014 | Carney | H04L 67/32 709/219 |
| 2014/0160033 A1 | 6/2014 | Brikman et al. | |
| 2014/0173089 A1* | 6/2014 | Li | H04L 67/1097 709/224 |
| 2014/0192717 A1 | 7/2014 | Liu et al. | |
| 2014/0229105 A1 | 8/2014 | Lee et al. | |
| 2014/0282957 A1* | 9/2014 | Thakore | H04L 63/0272 726/7 |
| 2014/0355542 A1* | 12/2014 | Zhang | H04W 4/027 370/329 |
| 2015/0026333 A1* | 1/2015 | Kubo | H04L 43/04 709/224 |
| 2015/0039601 A1* | 2/2015 | Harrang | G06F 17/30867 707/727 |
| 2015/0189006 A1 | 7/2015 | Smus et al. | |
| 2015/0359023 A1* | 12/2015 | Stojanovski | H04W 74/02 370/329 |
| 2015/0381756 A1* | 12/2015 | Lotfallah | H04L 67/2814 709/213 |
| 2016/0006765 A1 | 1/2016 | Shem Tov et al. | |
| 2016/0088068 A1* | 3/2016 | Toy | H04L 67/1097 709/219 |
| 2016/0127218 A1* | 5/2016 | Maloo | H04L 43/028 370/390 |
| 2016/0149923 A1* | 5/2016 | Zhang | G06Q 20/40 726/4 |
| 2016/0189119 A1* | 6/2016 | Bowman | G06Q 20/0453 705/39 |
| 2016/0191254 A1* | 6/2016 | Venezia | H04L 65/10 380/257 |
| 2016/0227319 A1 | 8/2016 | Zhao et al. | |
| 2016/0262021 A1* | 9/2016 | Lee | H04L 9/085 |
| 2016/0285874 A1* | 9/2016 | Smith | H04L 61/2589 |
| 2017/0026896 A1* | 1/2017 | Enomoto | H04W 92/18 |
| 2017/0085529 A1* | 3/2017 | Finkelstein | H04L 63/101 |
| 2017/0134357 A1* | 5/2017 | Ohlsson | H04L 67/146 |
| 2017/0207921 A1* | 7/2017 | Rantapuska | H04L 63/0272 |
| 2017/0262921 A1* | 9/2017 | Namboodiri | G06Q 30/0631 |
| 2017/0359185 A1* | 12/2017 | Hang | H04L 63/0823 |
| 2018/0091621 A1* | 3/2018 | Kuo | H04L 67/2823 |
| 2018/0199176 A1 | 7/2018 | Srivatsa | |
| 2019/0007836 A1* | 1/2019 | Ocak | H04W 12/0431 |

OTHER PUBLICATIONS

Office Action, Japanese Patent Application No. 2017-561830, dated Dec. 12, 2018, two pages.

* cited by examiner

CDN: Content Delivery Network

ZERO-ROUND-TRIP-TIME CONNECTIVITY OVER THE WIDER AREA NETWORK

FIELD OF THE INVENTION

The present application relates to wireless communications, and more particularly to optimizing communications latency over the wider area network, e.g. over the wider area internet.

DESCRIPTION OF THE RELATED ART

Communication systems are rapidly growing in usage. In recent years, many wired and wireless devices such as smart phones and tablet computers as well as television sets and video game consoles, for example, have become increasingly sophisticated. For example, in addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (WCDMA, TDS-CDMA), LTE, LTE Advanced (LTE-A), HSPA, 3GPP2 CDMA2000 (e.g., 1xRTT, 1xEV-DO, HRPD, eHRPD), IEEE 802.11 (WLAN or Wi-Fi), IEEE 802.16 (WiMAX), BLUETOOTH™, etc.

The ever increasing number of features and functionality introduced in both wired and wireless communication devices (many devices capable of wired and wireless communication) also creates a continuous need for improvement in both wired and wireless communications and in wired and wireless communication devices. In particular, it is important to ensure the accuracy of transmitted and received signals through user equipment (UE) devices, e.g., through devices such as cellular phones, base stations and relay stations used in wireless cellular communications, access points and relay stations used in Wi-Fi communications, and the many devices involved in internet communications, such as desktop computer, laptop computers, smart television sets and the like. The UEs, which may be mobile telephones or smart phones, portable gaming devices, laptops, wearable devices, PDAs, tablets, portable or stationary Internet devices, music players, data storage devices, or other devices, etc. may have multiple communication interfaces, many of them radio interfaces, that enable support of multiple radio access technologies (RATs) as defined by the various wireless communication standards (LTE, LTE-A, Wi-Fi, BLUETOOTH™, etc.) as well as other communication interfaces such as Ethernet ports, for example. The various communication interfaces may be used by various applications and the presence of the multiple communication interfaces, which may include multiple radio interfaces, may necessitate the UE implementing solutions to seamlessly run applications simultaneously over the multiple radio interfaces (e.g., over LTE/LTE-A, Wi-Fi and BLUETOOTH™, among others) without impacting the end-to-end performance of the application. That is, the UE may need to implement solutions to simultaneously operate multiple radio interfaces corresponding to multiple RATs (e.g., LTE/LTE-A, Wi-Fi, and BLUETOOTH™) in addition to operating wired interfaces as well.

Many wired and wireless communications conducted by UEs involve internet communication protocols which typically have an associated setup-cost, such cost varying depending largely on the latency between the initiating UE and the recipient endpoint. There's a physical limit to the speed at which information can be transmitted. Therefore, the minimum degree of latency (time)—during which a protocol can establish connectivity with a peer—may be measured, e.g., based on distance. With wired connectivity, latency is typically twice the speed of light, which is advantageous from a technology perspective but is still subject to distance considerations. Wireless connectivity may be prone to complications that can lead to latencies that are oftentimes many times higher than what is experienced in the case of wired connectivity. Furthermore, connectivity across the globe is subject to route-specific latencies. It is often faster (in terms of elapsed time) to communicate over a longer distance than a shorter one. The many reasons for this include but are not limited to congestion, equipment bandwidth, peering arrangements between corporate entities, etc. Finally, the need to actively and intelligently balance how data requests are satisfied has grown over the years. DNS (domain name service/servers) has traditionally been the technology of choice, yet is arguably no longer ideal. DNS is insecure as every DNS request leaks information about the requesting peer and user. In addition, DNS was never intended to reflect dynamic load information, yet it has been customary to use DNS in that capacity, causing DNS to incur some of the highest latency costs from a connectivity perspective.

Other corresponding issues related to the prior art will become apparent to those skilled in the art after comparing such prior art with the improvements as described herein.

SUMMARY OF THE INVENTION

Embodiments are presented herein of, inter alia, of a system and methods for zero-round-trip-time (zero-RTT) connection establishment for application service requests. The various strategies presented herein may be implemented during wired and/or wireless communications. Embodiments are further presented herein for wireless communication systems containing user equipment (UE) devices and/or base stations and/or access points communicating with each other within wired and/or wireless communication systems. Embodiments of the various zero-RTT connection establishment solutions disclosed herein may also be implemented using wired communication devices.

In some embodiments, a UE device may conduct wireless communications according to one or more wireless communication standards, e.g. cellular standards, Wi-Fi, or any other suitable wireless communications that provide access to the wider area network/internet. Alternatively or additionally, a UE device may conduct wired communications according to one or more wired communications standards, e.g., Ethernet, that provide access to the wider area network/internet. During such communications, e.g. when servicing application requests, the connection setup costs may be eliminated by reducing the distance between peers and/or reducing/eliminating the number of rounds-trips between peers before a connection is considered and established.

In some embodiments, a novel methodology may be used to ensure that a majority of connectivity initiated by UE devices is routed in a manner that reduces latency associated with connection establishment and/or subsequent communication. Accordingly, a dedicated server may be used to provide information identifying servers (such servers also referred to herein as "edges" or "edge servers") associated with a number of applications that may be executed on the UE device. The UE device may use this information to capture and determine lower-latency (e.g., improved or considered optimal) connectivity between a number of fixed-destination edge servers and all IP-addresses where the UE devices surface on the broader wide area network, e.g. over the broader Internet (accessed over Wi-Fi, Cellular, wired, etc.). The collected data/information corresponding to this lower-latency connectivity may be populated by means of sampling connectivity over time, across a broad device population, and processing the resultant data in a manner that allows the UE device to leverage this data/information during subsequent device-connectivity establishment. Accordingly, the need to employ DNS (domain name server) technology when servicing (individual} application requests may be altogether eliminated. Peer requests may be intelligently routed based on a dynamic, global, load-feedback mechanism, whilst ensuring the mechanism itself has the necessary levels of redundancy and robustness required to operate on a global scale. The above enables load-balancing on a global scale, as well as latency driven routing, whereby routing decisions may be intelligently made based on the various latencies that may be experienced during communications with various different servers and/or points of entry.

In some embodiments, the collected data/information corresponding to the improved connectivity performance may include addresses corresponding to (edge servers associated with) services that are obtained during initialization (more generally, prior to generating a service request) by the mobile device to cover a multitude of possible entry points to the service network (e.g. to the points of presence, or PoPs). The mobile device may thereby quickly fail over to another PoP if it doesn't receive a response, and the delays in receiving a response to the request are thereby reduced. In addition, security credentials may be pre-negotiated between the UE and each separate host. Numerous security credentials may be predetermined, and the appropriate security credential may be transmitted, as opposed to a blanket model in which one credential may be used for gaining access to multiple PoPs.

Note that the techniques described herein may be implemented in and/or used with a number of different types of devices, including but not limited to, base stations, access points, cellular phones, portable media players, tablet computers, wearable devices, other portable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present invention can be obtained when the following detailed description of the embodiments is considered in conjunction with the following drawings.

Figure 1:
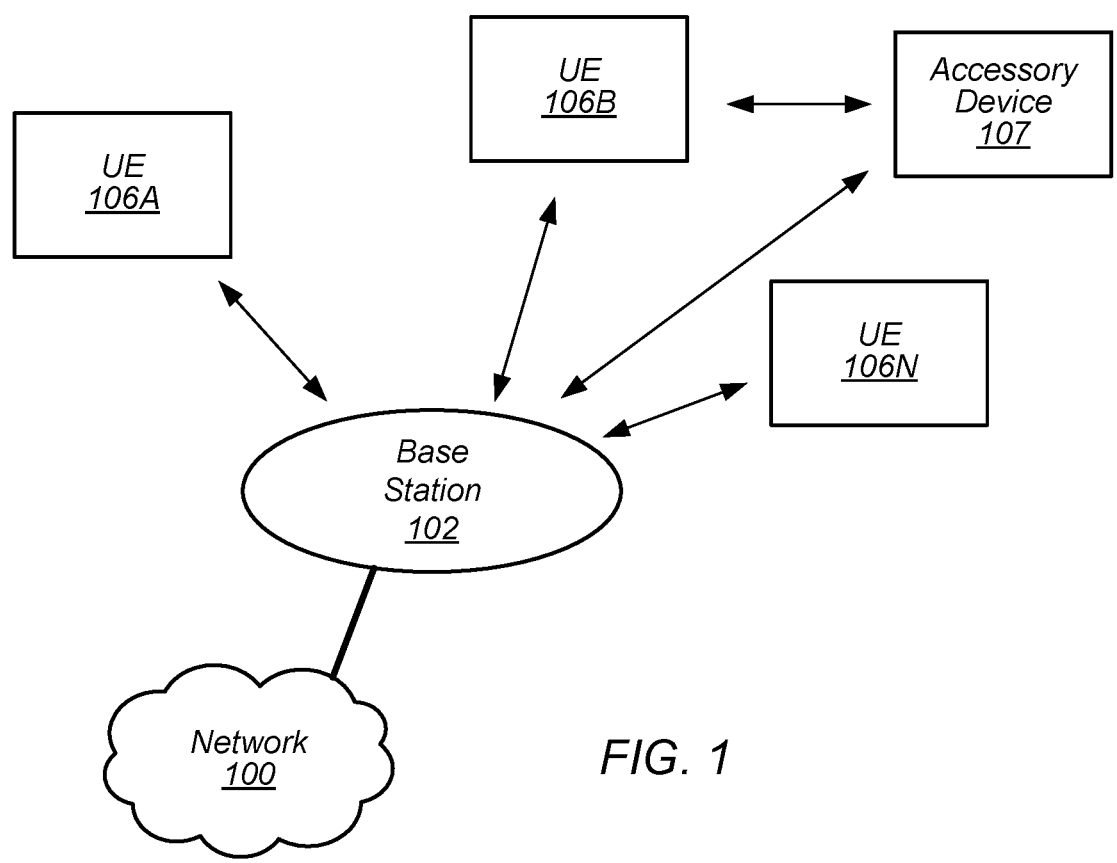
FIG. 1 illustrates an example (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Acronyms

Various acronyms are used throughout the present application. Definitions of the most prominently used acronyms that may appear throughout the present application are provided below:
BS: Base Station
CDMA: Code Division Multiple Access
CSFB: Circuit-Switched Fallback
DL: Downlink (from B S/AP to UE)
FDD: Frequency Division Duplexing
GSM: Global System for Mobile Communication
HO: Handover
LTE: Long Term Evolution
PDN: Packet Data Network
RAT: Radio Access Technology
RF: Radio Frequency
TDD: Time Division Duplexing
UE: User Equipment
UL: Uplink (from UE to BS/AP)
UMTS: Universal Mobile Telecommunication System
VoLTE: Voice over LTE
RT: Round Trip
RTT: Round Trip Time
TCP: Transmission Control Protocol
UDP: User Datagram Protocol

Terms

The following is a glossary of terms that may appear in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems devices capable of wired or wireless communication as further described herein. Some UEs are mobile or portable. UEs capable of wireless communications are also referred to as wireless communication devices. Examples of UEs include mobile telephones or smart phones (e.g., iPhone™, Android™-based phones) and tablet computers such as iPad™, Samsung Galaxy™, etc., portable gaming devices (e.g., Nintendo DS™, PlayStation Portable™, Gameboy Advance™, iPod™), laptops, wearable devices (e.g. Apple Watch™, Google Glass™), PDAs, portable Internet devices, music players, data storage devices, or other handheld devices, desktop computers, computer docking stations, smart televisions, etc. Various types of wireless communication devices fall into this category if they include Wi-Fi or both cellular and Wi-Fi communication capabilities and/or other wireless communication capabilities, for example over short-range radio access technologies (SRATs) such as BLUETOOTH™, etc. In general, the term "UE" or "UE device" may be broadly defined to encompass any electronic, computing, and/or telecommunications device (or combination of devices) which is capable of wired and/or wireless communication. As noted above, many UEs are portable, wearable, while other UEs may be mostly stationary.

Base Station (BS)—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, e.g. in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wireless Device (or wireless communication device)—any of various types of electronic devices, e.g. computer system devices, which perform wireless communications such as wireless local area network (WLAN) communications, cellular communications according to one or more of a number of different cellular radio access technologies, Wi-Fi communications, and the like. The wireless communication device may wirelessly communicate through one or more respective radio frequency (RF) interfaces that facilitate such communications. As used herein, the term "wireless device" may refer to a UE device, as defined above, or to a stationary device, such as a stationary wireless client or a wireless base station. For example a wireless device may be any type of wireless station of an IEEE 802.11 system, such as an access point (AP) or a client station, or any type of wireless station of a cellular communication system communicating according to one or more cellular radio access technologies (e.g. LTE, CDMA, GSM), such as a base station (or cellular tower) or a cellular telephone, for example. A wireless device may communicate according to multiple different radio access technologies, for example over multiple RF interfaces.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Station (STA)—The term "station" herein refers to any device that has the capability of communicating wirelessly, e.g. by using the 802.11 protocol. A station may be a laptop, a desktop PC, PDA, access point or Wi-Fi phone or any type of device similar to a UE. An STA may be fixed, mobile, portable or wearable. Generally in wireless networking terminology, a station (STA) broadly encompasses any device with wireless communication capabilities, and the terms station (STA), wireless client (UE) and node (BS) are therefore often used interchangeably.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

FIG. 1—Exemplary Communication System

FIG. 1 illustrates an exemplary (and simplified) wireless communication system, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more user devices 106-1 through 106-N and accessory device 107. Each of the user devices and the accessory device may be referred to herein as a "user equipment" (UE) or UE device. Thus, the user devices 106 are referred to as UEs or UE devices. For the purposes of this disclosure, accessory device 107 may also be considered a UE device.

The base station 102 may be a base transceiver station (BTS) or cell site, and may include hardware that enables wireless communication with the UEs 106A through 106N and with accessory device 107. Accessory device 107 may also communicate directly with a UE device, e.g. with UE device 106B. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the user devices and/or between the user devices and the network 100. In that sense, the base station 102 may be considered a part of network 100. The communication area (or coverage area) of the base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 3GPP2 CDMA2000 (e.g., 1×RTT, 1×EV-DO, HRPD, eHRPD), Wi-Fi, WiMAX etc. In some embodiments, the base station 102 communicates with at least one UE/accessory device that performs zero-RTT connectivity over the wider area network/internet as disclosed herein.

UE 106/107 may be capable of communicating using multiple wireless communication standards. For example, a UE 106/107 might be configured to communicate using either or both of a 3GPP cellular communication standard (such as LTE) or a 3GPP2 cellular communication standard (such as a cellular communication standard in the CDMA2000 family of cellular communication standards). In some embodiments, the UE 106/107 may be configured to operate with zero-RTT connectivity when servicing applications, at least according to the various methods as described herein. Base station 102 and other similar base stations operating according to the same or a different cellular communication standard may thus be provided as one or more networks of cells, which may provide continuous or nearly continuous overlapping service to UE 106/107 and similar devices over a wide geographic area via one or more cellular communication standards.

The UE 106/107 might also or alternatively be configured to communicate using WLAN, BLUETOOTH™, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 2—WLAN System

FIG. 1 illustrates an example WLAN system according to some embodiments. As shown, the exemplary WLAN system includes one or more wireless client stations or mobile devices, or user equipment (UEs), 106 that are configured to communicate over a wireless communication channel 142 with an Access Point (AP) 112. The AP 112 may be a Wi-Fi access point. The AP 112 may communicate via a wired or wireless communication channel 150 with one or more other electronic devices (not shown) and/or another network 152, such as the Internet. Additional electronic devices, such as the remote device 154, may communicate with components of the WLAN system via the network 152. For example, the remote device 154 may be another wireless client station. The WLAN system may be configured to operate according to any of various communications standards, such as the various IEEE 802.11 standards. In some embodiments, at least one mobile device 106 may be configured to communicate directly with one or more neighboring mobile devices (e.g., another mobile device 106), without use of the access point 112.

One or more mobile device 106 and/or the AP 112 may be configured to implement zero-RTT connectivity over the wider are network, e.g. when servicing application requests on the one or more mobile device 106.

Figure 3:
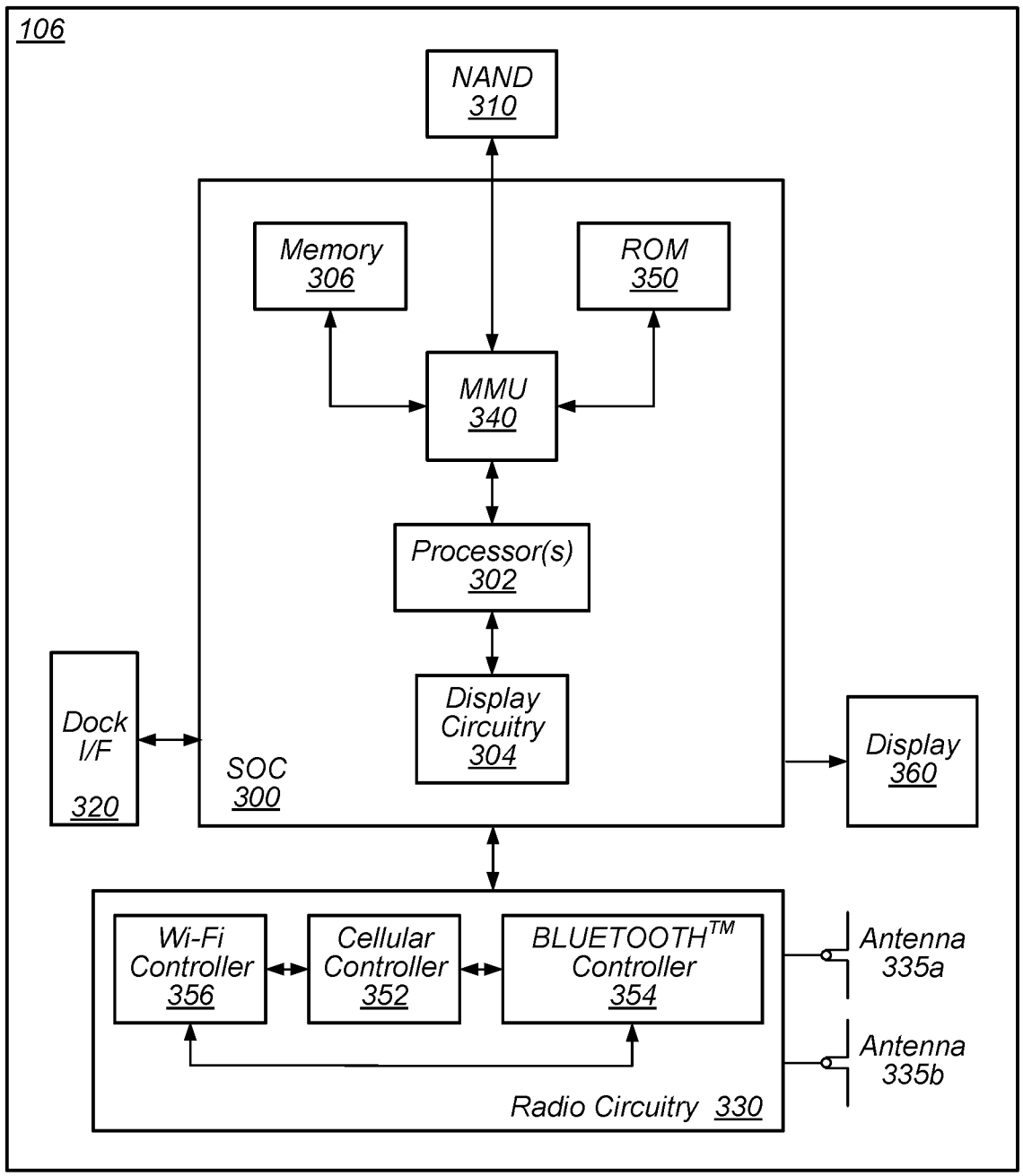
FIG. 3 illustrates the block diagram of an example UE, according to some embodiments.

FIG. 3—Block Diagram of an Exemplary UE

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio circuitry 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to the computer system), the display 360, and wireless communication circuitry (e.g., for LTE, LTE-A, CDMA2000, BLUETOOTH™, Wi-Fi, GPS, etc.). The UE device 106 may include at least one antenna (e.g. 335a), and possibly multiple antennas (e.g. illustrated by antennas 335a and 335b), for performing wireless communication with base stations and/or other devices. Antennas 335a and 335b are shown by way of example, and UE device 106 may include fewer or more antennas. Overall, the one or more antennas are collectively referred to as antenna 335. For example, the UE device 106 may use antenna 335 to perform the wireless communication with the aid of radio circuitry 330. As noted above, the UE may be configured to communicate wirelessly using multiple wireless communication standards in some embodiments.

As described further subsequently herein, the UE 106 (and/or base station 102) may include hardware and software components for implementing methods for at least UE 106 to establish zero-RTT connectivity over the wider area network/internet when servicing application requests. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to implement communications by UE 106 that incorporate selection of a communications channel/band for communications by UE 106 according to various embodiments disclosed herein. Specifically, processor(s) 302 may be coupled to and/or may interoperate with other components as shown in FIG. 3 to facilitate UE 106 communicating in a manner that seeks to establish zero-RTT connectivity over the wider area network, e.g. when servicing application requests on the UE 106, according to various embodiments described herein.

Processor(s) 302 may also implement various other applications and/or end-user applications running on UE 106.

In some embodiments, radio circuitry 330 may include separate controllers dedicated to controlling communications for various respective RAT standards. For example, as shown in FIG. 3, radio 330 may include a Wi-Fi controller 356, a cellular controller (e.g. LTE controller) 352, and BLUETOOTH™ controller 354, and in at least some embodiments, one or more or all of these controllers may be implemented as respective dedicated circuits for example integrated circuits (ICs or chips, for short) in communication with each other and with SOC 300 (and more specifically with processor(s) 302). For example, Wi-Fi controller 356 may communicate with cellular controller 352 over a cell-ISM link or WCI interface, and/or BLUETOOTH™ controller 354 may communicate with cellular controller 352 over a cell-ISM link, etc. While three separate controllers are illustrated within radio circuitry 330, other embodiments have fewer or more similar controllers for various different RATs that may be implemented in UE device 106. Furthermore, similar to processor(s) 302, the various controllers 356, 352 and 354 may be implemented as a combination of hardware and software, using one or more processing elements (as described above with respect to the various terms used herein).

Figure 4:
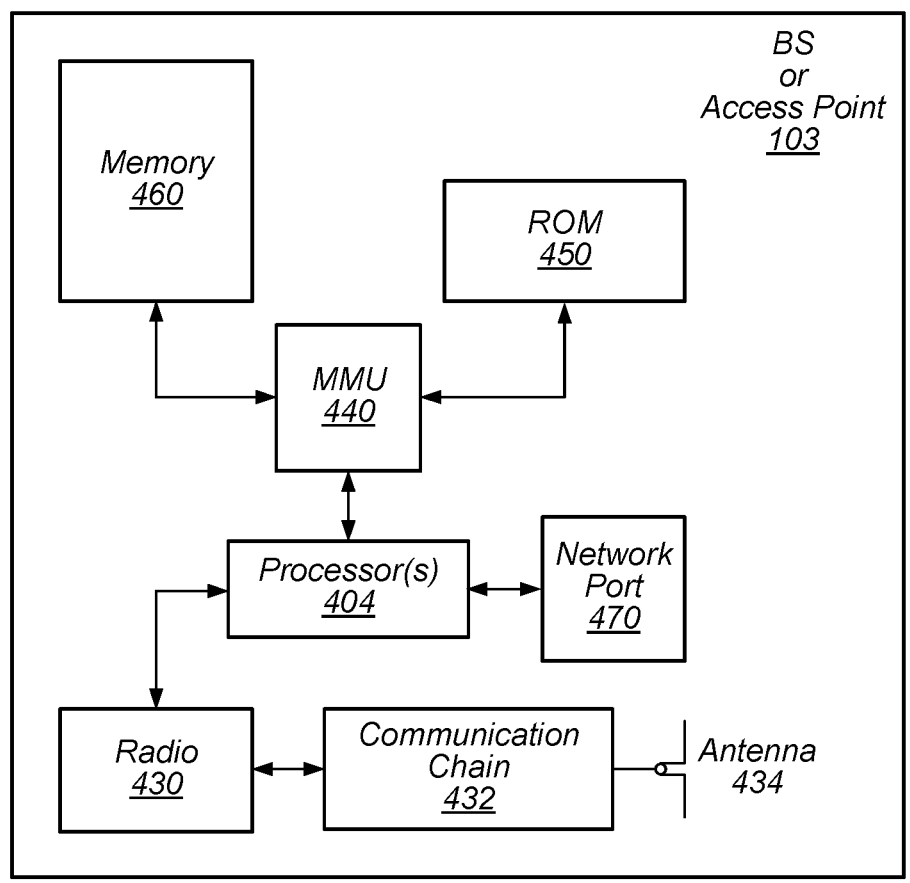
FIG. 4 illustrates the block diagram of an example base station/access point, according to some embodiments.

FIG. 4—Block Diagram of an Exemplary Base Station/Access Point

FIG. 4 illustrates a block diagram of an exemplary base station/access point 103, according to some embodiments. It is noted that the base station/access point of FIG. 4 is merely one example of a possible base station/access point. As shown, the base station/access point 103 may include processor(s) 404 which may execute program instructions for the base station/access point 103. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

Figure 2:
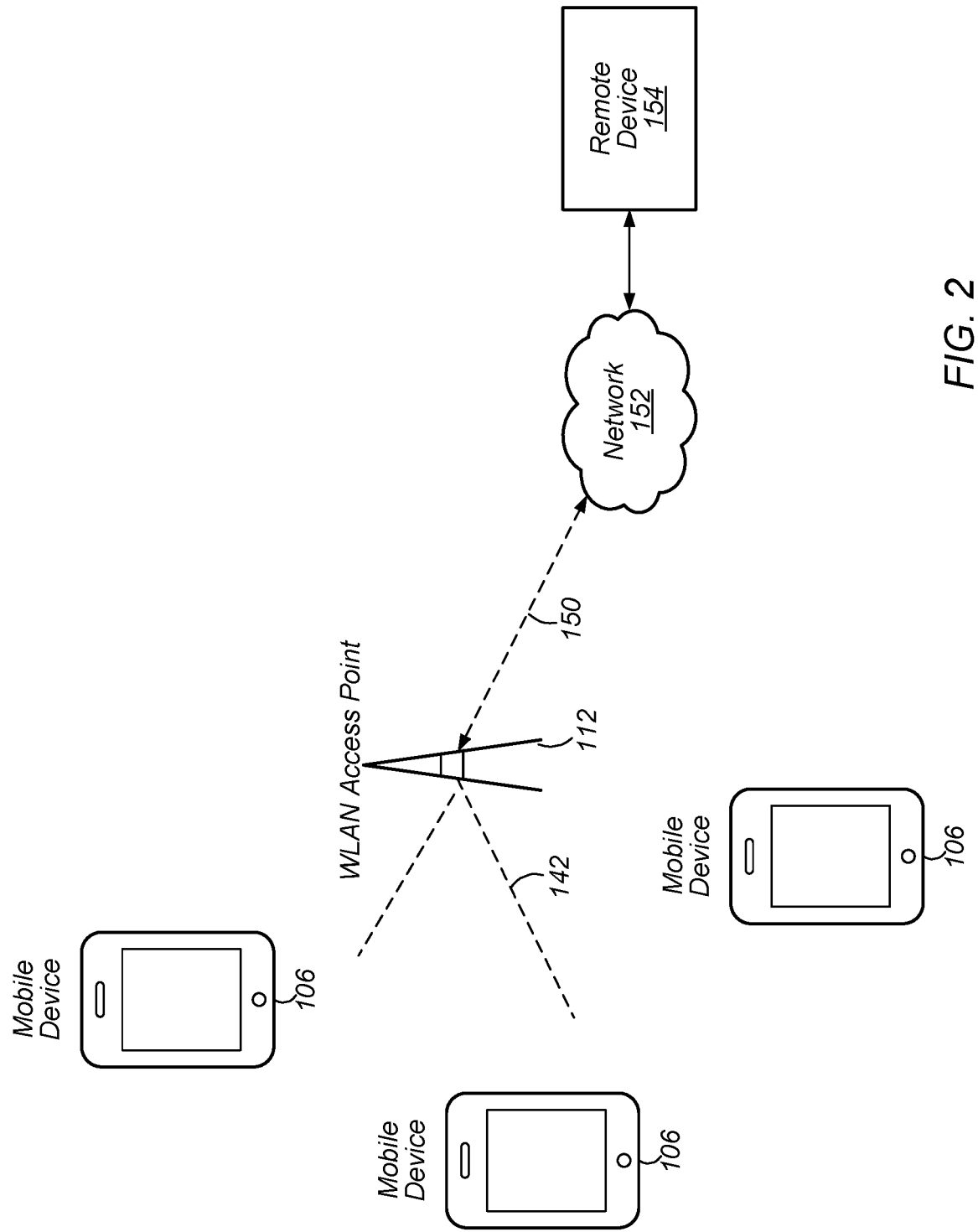
FIG. 2 illustrates an example WLAN communication system, according to some embodiments.

The base station/access point 103 may include at least one network port 470. The network port 470 may be configured to couple to a wireless network and provide a plurality of devices, such as UE devices 106, access to the wireless network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station/access point 103 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be designed to communicate via various wireless telecommunication standards, including, but not limited to, LTE, LTE-A WCDMA, CDMA2000, Wi-Fi, etc. The processor 404 of the base station/access point 103 may be configured to implement part or all of the methods described herein, e.g., by executing program instructions stored on a memory medium (e.g., a non-transitory computer-readable memory medium), for base station/access point 103 to communicate with a UE device capable of establishing zero-RTT connectivity over the wider area network, e.g. when servicing application requests on the UE device. Alternatively, the processor 404 may be configured as a programmable hardware element, such as an FPGA (Field Programmable Gate Array), or as an ASIC (Application Specific Integrated Circuit), or a combination thereof. In the case of certain RATs, for example Wi-Fi, base station/access point 103 may be designed as an access point (AP), in which case network port 470 may be implemented to provide access to a wide area network and/or local area network (s), e.g. it may include at least one Ethernet port, and radio 430 may be designed to communicate according to the Wi-Fi standard. Base station/access point 103 may operate according to the various methods as disclosed herein for communicating with mobile devices that can establish zero-RTT connectivity over the wide/wider area network when servicing application requests for applications running on the mobile devices.

Figure 5:
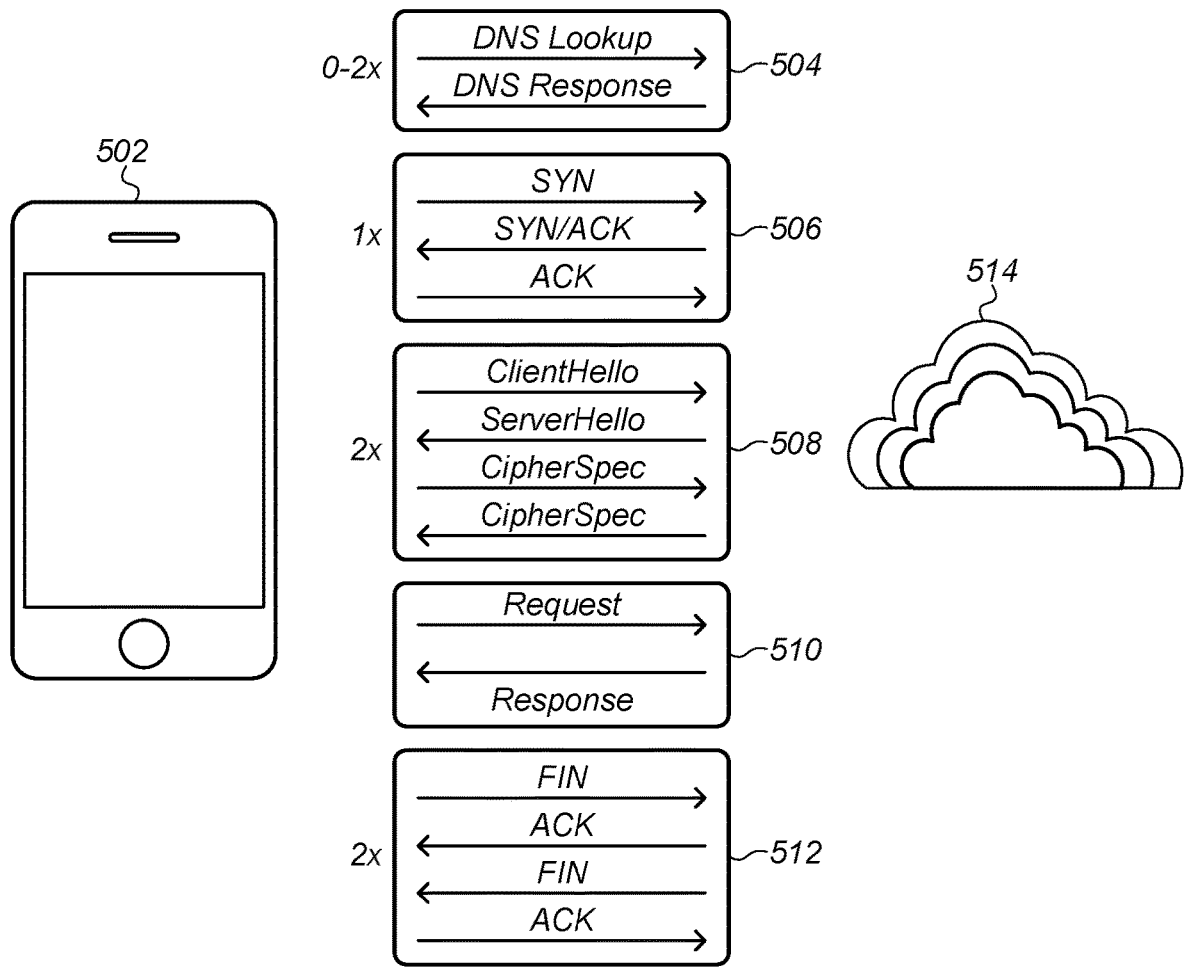
FIG. 5 shows various communications steps required to generate and transmit an application service request, according to prior art.

FIG. 5—Issuing Service Requests

FIG. 5 shows the various communications steps required to generate and transmit an application service request, according to prior art. An application running on mobile device 502 may require/commission a service request, which may initiate a series of actions as outlined in FIG. 5. When an application, e.g. running on UE 502, issues a service request, servicing such a request presently involves performing DNS lookups. Accordingly, as part of the process of generating the service request, a DNS lookup 504 is performed first. The lookup and response may take up to 2 round trips (RTT) to complete. Furthermore, DNS lookups may take multiple seconds. In order to alleviate some of the latency associated with DNS lookups, DNS caching has been introduced. DNS caching involves storing/caching the results from DNS lookup locally on the UE for a specified length of time. However, this may lead to an unfortunate tension, as DNS is also used for fail over purposes. At times some of the servers (corresponding to resolved addresses) may fail and go offline. One solution that seeks to avoid attempts at contacting such offline servers is to place a short timeout on DNS caching, so if there is a failure within a short time period (e.g. couple of seconds) next time a DNS request is issued, a different address is returned. This, however, counteracts the purpose of DNS caching. Therefore, avoiding repeated DNS lookups is desirable.

A next action in the process is establishing a connection per a transmission protocol, in this case according to TCP. The SYN (synchronization), SYN/ACK (synchronization acknowledge) and ACK (acknowledge) process 506 with TCP can take 1.5 (RTT) just to get the request to the desired server (in 514). Next, a cryptographic handshake 508 used in establishing a trusted/secure connection can take anywhere from 1 RTT to 2 RTT to complete. Overall 3-4 RTTs may need to take place before the service request 510 is sent out. This time does not even include (take into account) potential failures. It may then take another 2 RTT to provide/receive the appropriate acknowledgment 512 of the (completion of the) request. The more RTT are induced/required (especially on a cellular network), the more likely a timeout is to occur.

Therefore, reducing the number of RTT reduces the likelihood of encountering many of the problems that might occur while the RTT communications are taking place. Accordingly, eliminating some of the RTT that are presently required not only reduces the time it takes to have the service request to its proper destination, it also increases the likelihood of receiving an immediate response, which may provide a much improved user experience. The service request flow illustrated in FIG. 5 may therefore be improved by eliminating some of the handshakes (504, 506, 508, and 512) that currently required.

Zero-RTT Connectivity

TLS—transport layer security and its predecessor, Secure Sockets Layer (SSL), both of which are frequently referred to as 'SSL'—are cryptographic protocols that provide communications security over a computer network. TLS is the de-facto interne cryptographic standard for establishing an encrypted link between a web server and a browser, with the link ensuring that all data passed between the web server and browsers remain private and integral. In general, TLS provides means through which trust may be established with a server, the UE/client receiving a TLS session ticket from the server. The client retains that session ticket and may subsequently present it back to the server as proof of the previously established trusted connection. However, at least one RTT is required to establish such a trusted connection. A similar secure connection may be established but in an optimized manner, leveraging knowledge of/about both the client and the server. Optimized, in this context, may be interpreted as referring to solutions in which latency, overhead, and/or similar issues associated with establishing such connections are reduced in order to achieve improved performance with respect to any one or more performance metrics such as connection setup time or throughput, for example. Such an optimized scenario may be labeled a "zero-RTT trust establishment" or "zero-RTT trust re-establishment" (or "zero-RTTT-crypto" for short).

In one set of embodiments, trust with a server may be established a priori, out-of-band, and the result of that trust may be subsequently used to reestablish cryptographic session(s) with zero RTT. In one sense, certain steps/actions performed during the trust establishment phase out-of-band may be relied upon as demonstrable proof at subsequent stages (later), whereas TLS isn't quite capable of achieving this. This is due, at least in part, to the fact that TLS still requires at least one RTT to exchange information. In one sense, some of the mechanisms required by TLS to satisfy all conditions in the open interne may be sidestepped.

As previously mentioned, in present systems, when attempting to access a trusted website a DNS lookup takes place to determine the IP address of the server with which communication is to take place, and once the IP address has been determined a TLS session is initiated. Once the TLS session has been established, the trust establishment process with the server begins (exchange of keys, etc.) It is desirable to take this process outside the connection request (e.g. out-of-band of the connection request). That is, it is desirable to not have to perform this process as part of the connection request (service request), and have the ability to assume an established trusted connection for sending the service requests when the service request is initiated.

In some implementations, one or more security credentials, such as one or more cryptographic and/or authentication credentials or keys, may be negotiated (or obtained) "out-of-band" (as described above) to reduce the transaction time associated with establishing the security credential(s). For example, a security credential may be established and/or refreshed opportunistically—instead of at the time the security credential is required for use—when bandwidth and/or computational resources are available. As a result, the security credential may be available when needed, without first having to engage in a real-time transaction to obtain the credential, thereby reducing latency.

When one or more security credentials are established in advance, the expiration of such credential(s) may also be determined. When a security credential is nearing its expiration, a new security credential may be negotiated out-of-band, ensuring that a valid security credential for a given purpose is available at a later time as needed. To that end, in some embodiments, numerous security credentials (e.g., corresponding to a variety of hosts) may be negotiated out-of-band in advance, and refreshed as necessary, for use in one or more transactions. When a security credential is needed for a request, an appropriate pre-negotiated credential may be selected and used.

Figure 6:
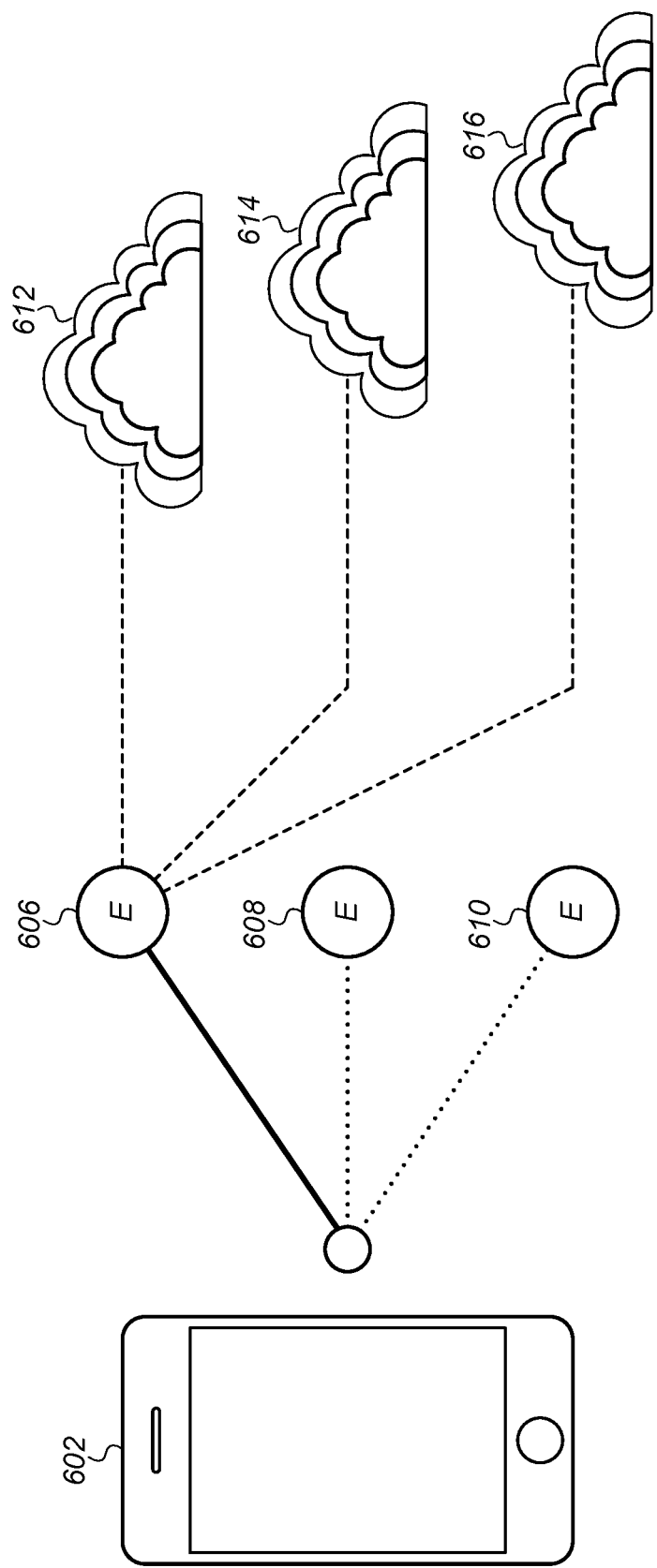
FIG. 6 shows the block diagram of an example wide area network communication system that supports application services, according to some embodiments.
Figure 7:
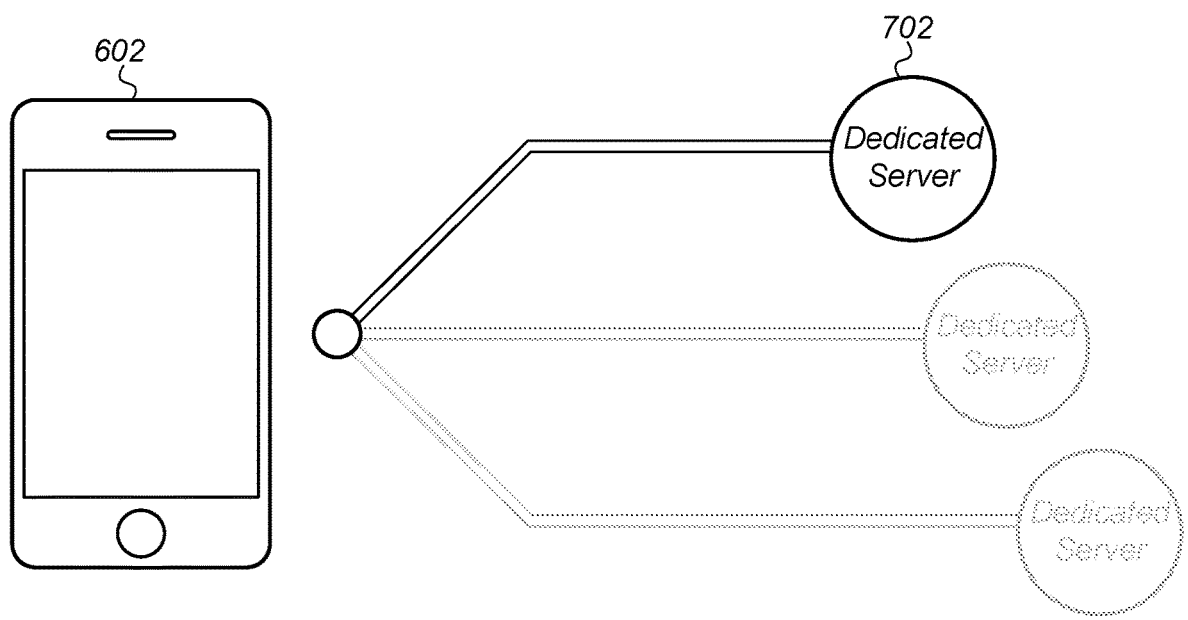
FIG. 7 shows the block diagram of an example communication system that includes a dedicated server that provides wider area network information relating to application services, according to some embodiments.
Figure 8:
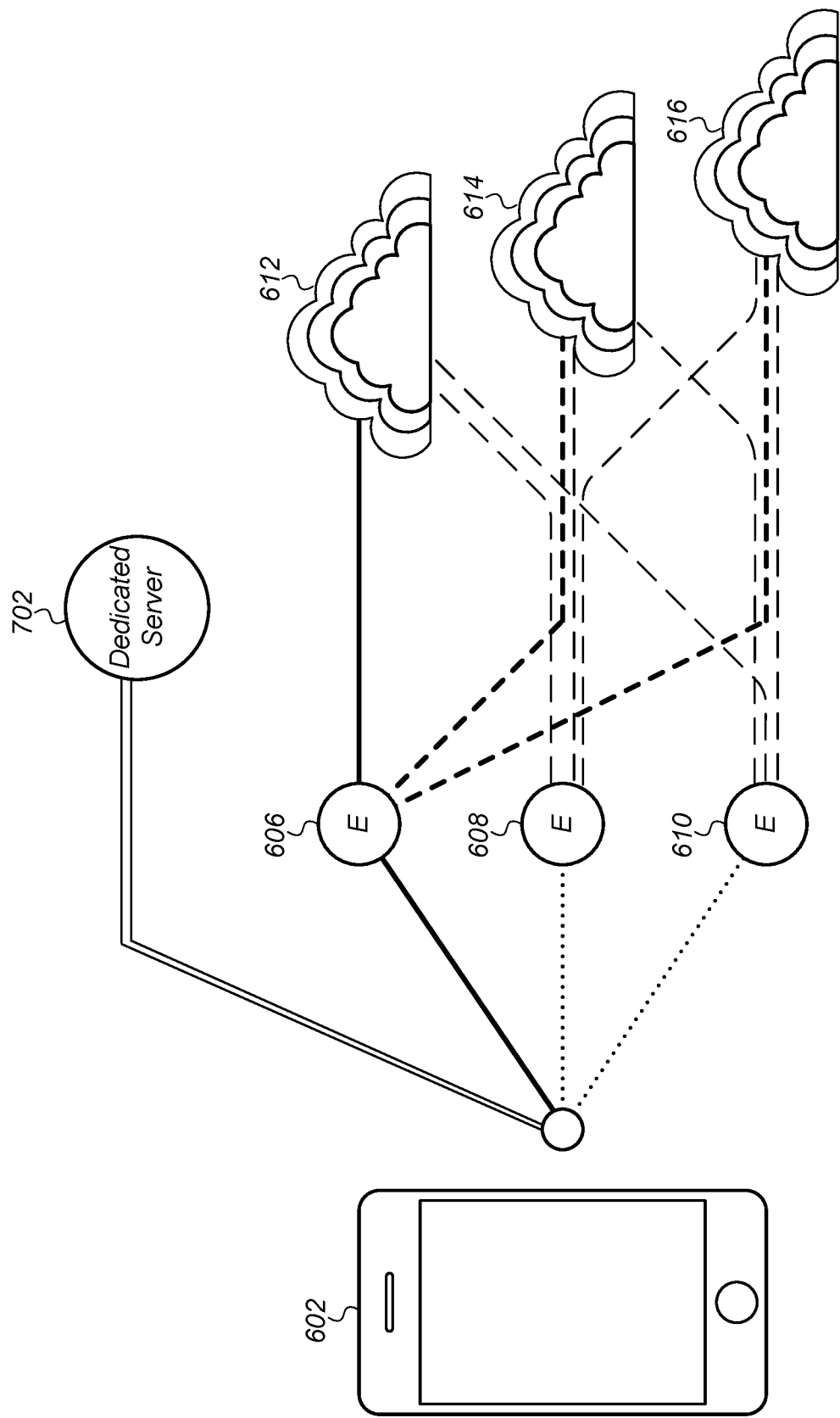
FIG. 8 shows the block diagram of an example wide area network communication system that supports application services and includes a dedicated server that provides wider area network information relating to application services, according to some embodiments.

FIG. 6 shows the block diagram of an example wide area network communication system that supports application services, according to some embodiments. Specifically, the system shown in FIG. 6 includes servers 606, 608, and 610 that are known to be associated with one or more applications executed/running on UE 602. The servers 606, 608, and 610 may be in communication with data centers 612, 614, and 616, which may include servers/storage providing data for the service requests originating from the various applications executed/running on UE 602. FIG. 7 shows the block diagram of an example communication system that includes a dedicated server that provides wider area network information relating to resources used in servicing application requests for applications executed/running on UE 602. FIG. 8 shows the block diagram of an example wide area network communication system that supports application services and includes a dedicated server that provides wider area network information relating to resources for application services. In a way, the system in FIG. 8 represents a system that may support zero-RTTT connection establishment over the wider area network/internet as will be further described below.

In some embodiments, when the device 602 boots up, it may locate dedicated server 702 (e.g. via a single DNS lookup), and may obtain information regarding edge servers 606, 608, and 610 from dedicated server 702. In general, servers (or edge servers) 606, 608, and 610 are representative of servers used in servicing application service requests that are issued by UE 602. There may be any number of edge servers associated with any one or more applications. While the system in FIG. 8 shows a certain number of edge servers and data centers, alternate embodiments may include a different number of servers and/or data centers as desired. Dedicated server 702 may obtain and provide the information regarding edge servers 606-610 in a number of ways. For example, in some embodiments, instead of using the client-address and determining server-side (i.e. at server 702) which edge server addresses should be returned by server 702 to UE 602, the dedicated DNS server 702 may instead return a topology file containing all the edge servers (or edge server addresses) available to UE device 602 and all host-addresses within those edge servers. UE 602 may then determine the best place to connect (at all times) based, for example, on the measured latency to the edge servers. In other words, UE 602 may perform its own probing to the edge servers 606-610 in order to determine a preferred set of connection points (or points of presence, POP) from among servers 606-610 to use for the various services. UE 602 may maintain these relationships independently per network signature. For example, the chosen edge servers may be different for respective communications conducted over different radio access technologies, e.g. over Wi-Fi, cellular, etc. More generally, a network signature may be thought of as collective information representative of a respective network, and may include information representative of the type of the network (e.g. Wi-Fi, cellular, Ethernet, etc.), the network provider, IP addresses, and/or gateway address, among others. This represents a significant improvement in multiple ways. For example, there is no need for dedicated server 702 to generate a latency map up front, as UE 602 may instead determine the latency in real time.

Based on the information received from dedicated server 702, the UE 602 may communicate with the appropriate server(s) 606-610 and perform a cryptographic handshake procedure(s) for trust establishment. UE 602 (also referred to in this scenario as the client) has the ability to maintain some information which may be used at a later stage when a service request is actually issued. Thus the actual service request may be sent to the server (any of servers 606-610) cryptographically, i.e. in a trusted manner. Because trust establishment is performed out-of-band e.g. during boot up) as opposed to being a part of the service request process, the time elapsed during the trust establishment may not be an issue, and consequently an even deeper trust may be established between the client and the server. For example, the server (any one of servers 606-610) may make extreme requirements on the client that would simply not be feasible in a regular TLS type environment. This also allows for extended periods of time taken to establish trust between devices (clients and servers, e.g.), purely because the establishment procedure is explicitly out-of-band. As a further consequence, a number of interesting characteristics of the handshake may be leveraged, such as guided tour, secure enclave type solutions, which are enabled by the availability of time to perform the trust establishment.

In contrast to the above, attempts at zero-RTT TLS solutions are susceptible to replay attacks. Though intercepted packets may not be decrypted, replaying the packets may cause many problems. Because the packets are already encrypted they appear legitimate to the destination device. Thus, it may be necessary to consider how to effectively manage a state mechanism on the server for every client that might possibly connect to the server, without excessive resource requirements. To this effect, the server may include a unique construct specifically for handling replay recognition and rejection. That same construct may also allow for UDP racing for transmitting the same packet to the server over both UDP and TCP, as will be further described below.

The mechanisms described above facilitate UE 602 sending out a service request—when the service request is required/commissioned—without first having to perform the DNS procedure (504), ACK procedures (506 and 512) and handshake procedures (508) as part of the request process. Thus, even multiple parallel requests might be initiated in the very first requests packet.

As also mentioned above, with the help of dedicated server 702, UE 602 may itself obtain information from edge servers 606-610 to determine which of those servers are geographically close/available, and/or which of those servers may be most likely to respond with lowest latency. Latency may be determined by UE 602 based on repeated requests from a specific application from UE 602, for example. Another way may be for UE 602 to periodically check the servers 606-610 (for example using an application specifically for the purpose of determining latency). In one sense, information is gathered ahead of time about potential servers that will be used to service outgoing service requests (from the device 602), and the collected information is leveraged when sending (application commissioned) service requests later on.

Once a request has been processed by the server, the server (of 606-610) may service all subsequent requests efficiently, for example knowing which data center (of 612-616) to route to, etc. As previously mentioned, a single DNS lookup may be performed by the device 602, for example during boot up to identify and access dedicated server 702, which may provide information to UE 602 identifying the servers (606-610) that may be used for the requests later. For example, during boot up, the device may query a specific DNS (e.g. dedicated server 702) to determine IP addresses to be used for requests at a later time.

The ACK and SYN ACK (506) may therefore be eliminated because data may be transmitted in the very first service request packet. One way of transmitting the service request packet may be via TFO (TCP Fast Open). Where TFO may not be applicable/may not work, UDP racing may be employed. Instead of relying just on TFO, the entire packet may be sent over TCP and UDP. The (edge) server (of 606-610) may determine how to process the packet. For example, in case TFO is not working, a TCP packet may take longer to reach the server, and the corresponding UDP packet may reach the server first. The server may accept the UPD request packet, and subsequently accept the TCP connection, filtering out from the TCP packet any of the requests that have also been received in the UDP packet and have already been processed. UDP may be used since the content of the packet has already been encrypted (per the trust having been established out-of-band). Replay rejection may indicate to the upper layers that an attempt has been made to send the same packet twice. However, the upper layer(s) may recognize that in this case the dual transmission of the packet was intentional per the established relationship between UDP and TCP. Internal mechanisms may be used to ensure that this relationship is well established, for example as part of the employed cryptography. For example some mechanisms may ensure that multiple UDP packets are not being spoofed and transmitted at the same time that the TCP packet is being received. Thus, even if the TCP packet has required 1½ RTT to arrive, a UDP packet received within ½ RTT may have already initiated the request out to the data centers/servers.

As alluded to above, the elimination of the handshake (508) from the service request procedure through performing the cryptography out-of-band allows for more than one request to be included in the initial request packet. In other words, the service request packet may include more than one request at a time since the data has already been encrypted. Combined with the UPD racing as also described above, service requests may be satisfied more efficiently and quicker, leading to improved user experience.

By "collecting" server information during boot up, failover may also be addressed. The device may automatically fail over to alternate servers (of 606-610) in case a server (of 606-610) is not available. This is a vast improvement over having to wait for DNS information to propagate through the system and waiting for updates to take place. Thus, failover and failback may occur faster because the device 602 is now in charge of these procedures. For example, one of servers 606-610, for example server 606 may have been identified as the primary server for servicing requests for a particular application. In case primary server 606 has gone offline, a secondary server, e.g. server 608 may be used, and while UE 602 uses server 608 for servicing the request, it may also probe the primary server again out-of-band to ascertain whether it has since become available for reconnecting. If so, subsequent requests may again be routed to the primary server 606. Since such probing is performed out-of-band, there is no associated "cost" when making the user/application requests. In addition, such probes may be performed when the radio circuitry is turned on for any other purpose, e.g. for a user initiated purpose, and may be performed in the background while the radio circuitry is in use by a user initiated and/or other application.

Each of the edge servers 606-610 may also have a respective connection/connectivity to each of the data centers/servers 612-616. The data centers 612-616 may also be prioritized as primary, secondary, and tertiary in terms of accessibility and provisioning of requested data. This provides redundancy that minimizes if not outright eliminates response failure as at least one responsive route may be established for the request. For example, in a system that includes 3 edge servers and 3 data centers as shown in FIG. 8, nine possible routes may be established between device 602 and a data center (of 612-616) servicing a request. This results in a robust system.

In some embodiments, negotiation (for secure connection establishment) may take place between the device and individual hosts (within the edge server of 606-610). Accordingly, there may be security credentials/information established for the device for each host, and the appropriate respective credentials may be supplied by UE 602 when communicating with any of the hosts. The specific relationship between the device 602 and the host may be established to increase entropy in the cryptography, for example. The server (of 606-610) itself may not keep records of these security tickets, which may be managed by the device instead. This leads to another aspect of the relationship between the client 602 and the edge server. If the host of the edge server goes down, the relationship between the disabled host and any other device (e.g. between the disabled host and UE 602) may be terminated, and any records and/or information pertaining thereto may be completely eliminated on the host side. The next time a client (device, e.g. UE 602) attempts to establish connection with that host (once the host is no longer disabled), that attempt may be immediately rejected by the host. Thus, not retaining security keys on the server side also provides increased security. Accordingly, the device 602 may establish a trusted relationship with each edge server host out-of-band, e.g. at boot time, and if one of the hosts subsequently fails, communications may continue between the device and another one of the hosts with which the device has established a trusted relationship. There is no need to renegotiate a trusted connection, instead a trusted connection may simply be reestablished with another trusted host, and at some point later—as a background process, that is, out-of-band—the trusted relationship may be reestablished with the previously unavailable host.

Figure 9:
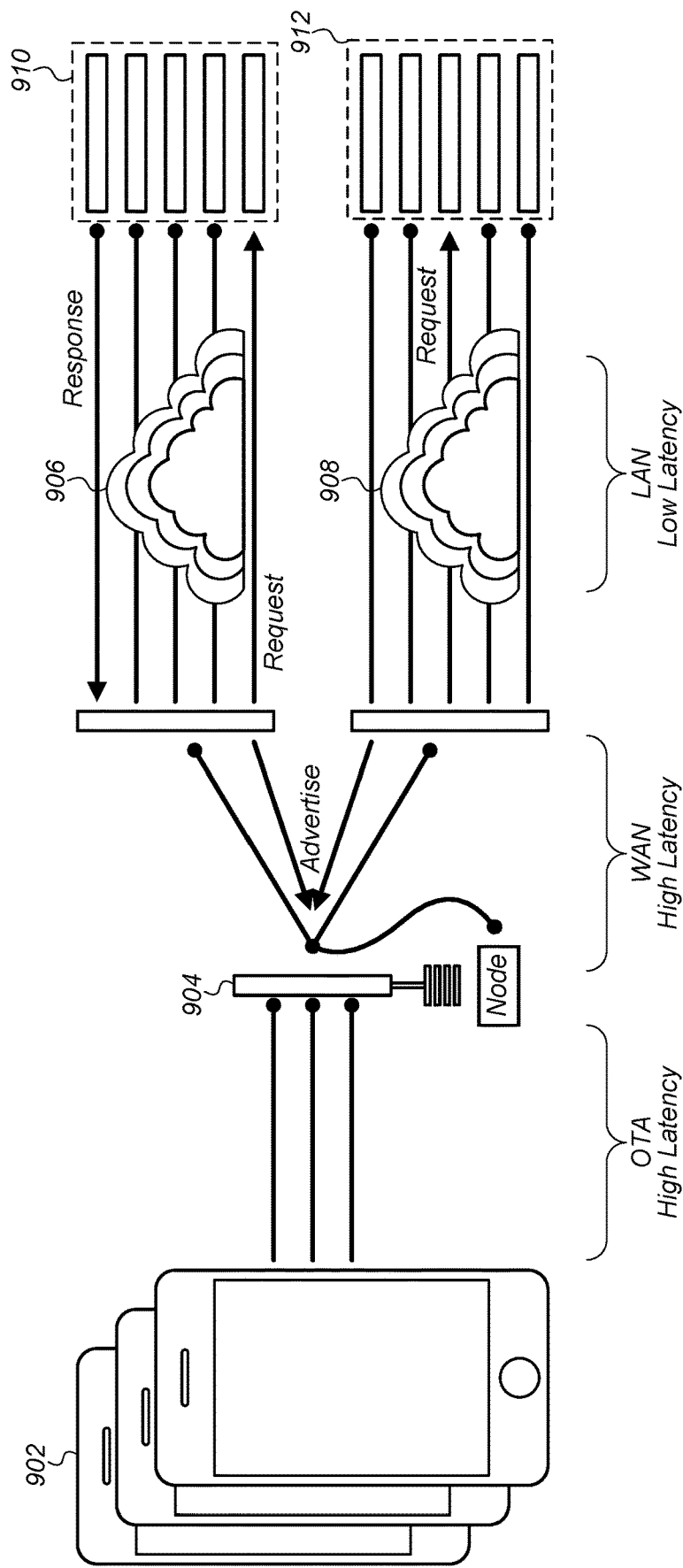
FIG. 9 shows the functional block diagram of an example wide area network communication system that supports servicing application requests, according to some embodiments.

Another aspect of the zero-RTT connectivity for service requests is the relationship between the servers 606-610 and the data centers 612-616. As highlighted in FIG. 9, edge servers 606-610 are collectively illustrated as an edge server network node 904 servicing the various service requests commissioned by applications executed on device 602. Data center 906, which may include corresponding servers 910 storing data, and data center 908, which may include corresponding servers 912 storing data, may "advertise" their services to the edge servers 904. That is, the data centers 906-908 may communicate their available services to the edge servers 904. Furthermore, data centers 906-908 may indicate whether they are primary, secondary, tertiary etc. providers for a given (respective) service. The edge servers 904 may keep a record of these advertised services to determine where, e.g. to which of data centers 906-908 given requests are routed. Therefore, the service requests may also include a service identifier used in routing the requests to the most appropriate service providers. For example, an identifier in the service request may indicate that it is a request for map components, and thus the request may be routed to a data center/server (of 906/910-908/912) that is tracked by the edge server(s) 904 as a provider of map services. In this manner a service request may be matched with a most appropriate advertising back end service. The edge server(s) 904 may recognize the service identifier and route the request accordingly to its most appropriate destination.

Figure 10:
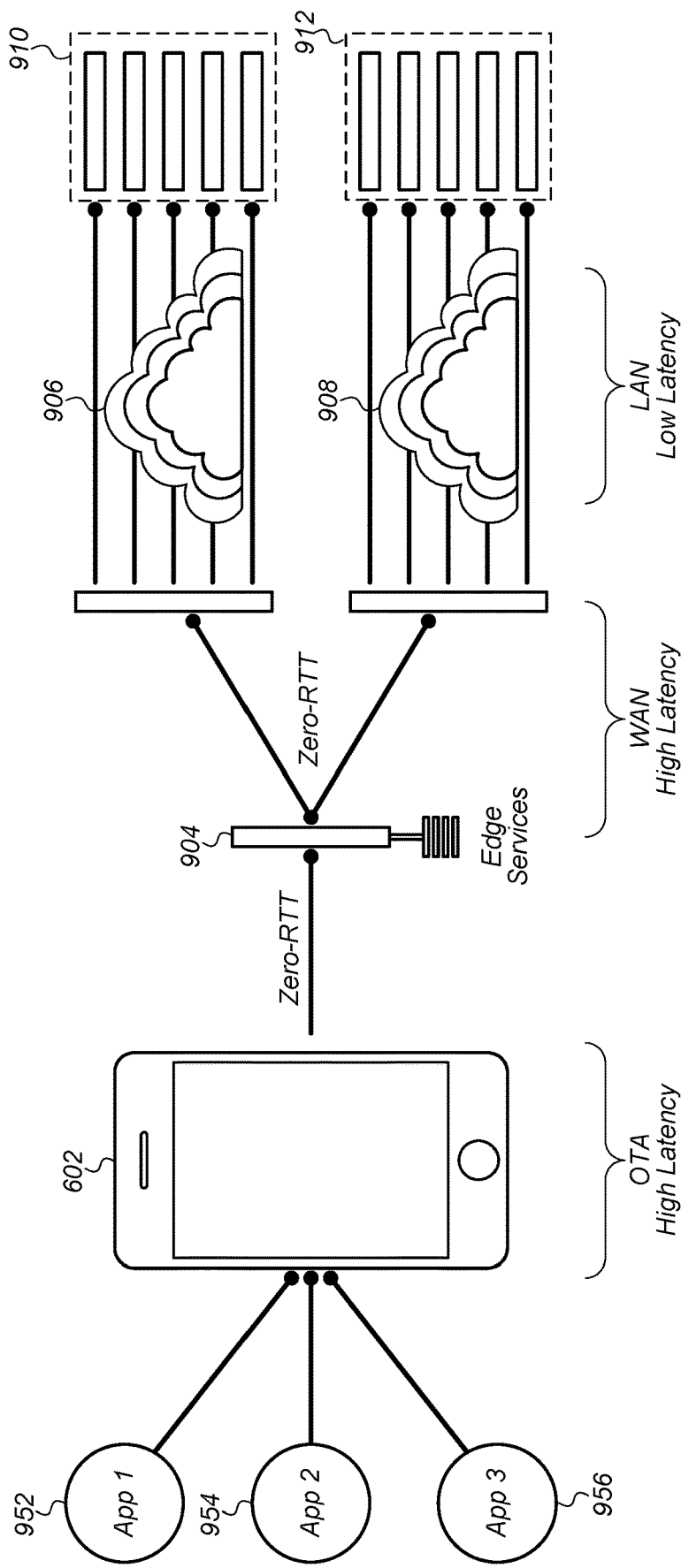
FIG. 10 shows the functional block diagram of an example wide area network communication system that supports zero-round-trip-time connectivity when servicing application requests, according to some embodiments.

As an overview, FIG. 10 shows the functional block diagram of an example wide area network communication system that supports zero-RTT connectivity when servicing application requests, according to some embodiments. Applications 952, 954, and 956 running on device 602 may commission respective associated service requests. The service requests may be transmitted with zero-RTT per the various procedures described above, and may be routed to the most appropriate servicing data center/server 906/910 or 908/912 by edge services 904. It should be noted again that while FIG. 10 shows a specified number of data centers/servers, the number of such centers/servers may vary from system to system based on various system requirements and the type of supported applications for which service requests may be serviced.

Figure 11:
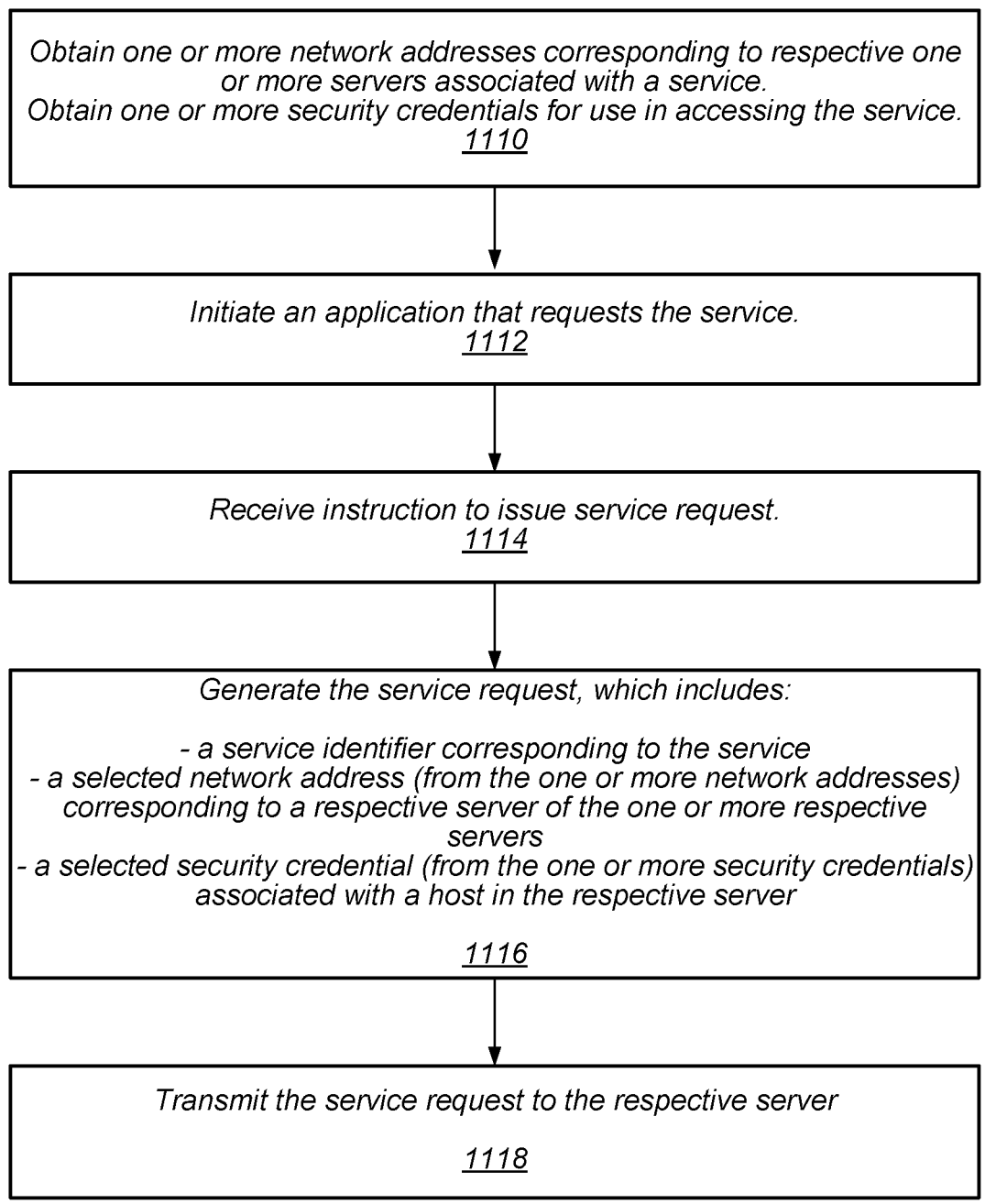
FIG. 11 shows a flow diagram of one example of a method for initiating a service request, according to some embodiments.

FIG. 11 shows a flow diagram of one example of a method for initiating a service request, according to some embodiments. A communication device, e.g. such as UE 602, conducting wired and/or wireless communications, may obtain, prior to initiating an application requesting a service, one or more addresses corresponding to respective one or more servers associated with the service, and one or more security credentials for use in accessing the service (1110). The communication device may initiate an application that requests the service (1112), which instructs the communication device to issue a service request (1114). In response to being instructed to issue the service request, the communication device generates the service request, which may include a service identifier corresponding to the service, a selected address (from the one or more previously obtained addresses) corresponding a respective server of the one or more servers, and a selected security credential (from the one or more previously obtained security credentials) associate with a host in the respective server (1116). The communication device may then transmit the service request to the respective server associated with the service (1118).

In some embodiments, in 1118 the communication device may transmit the request in a first packet and also transmit the request in a second packet, and furthermore the request in the first packet may be transmitted according to a first communication protocol (e.g. TCP) and the request in the second packet may be transmitted according to a second communication protocol (UDP). In some embodiments the communication device may transmit the first packet and the second packet simultaneously or it may transmit the two packets within a specified time period. The communication device may perform 1110 during a boot up procedure of the communication device.

In at least one set of embodiments, when the one or more addresses represent multiple addresses corresponding to the same service, the communication device may automatically select a different address from the multiple addresses to issue a service request if the communication device cannot access the service using the first selected address. Furthermore, the communication device may periodically, for example when the radio circuitry in the communication device has already been turned on for other purposes, test the connections to the one or more servers associated with the service to determine which of the servers to connect to in case a service request is to be issued in the future for the service. The communication device may also maintain individual security credentials for the hosts residing inside the one or more servers, and use the appropriate security credential when transmitting service requests in the future. The security credentials and addresses may be obtained by the communication device from a dedicated server, for example upon boot-up. In some embodiments the dedicated server may provide a list of addresses of all servers respectively associated with a variety of services, and the communication device may establish secure relationships with a number (or all) hosts corresponding to these servers. The communication device may then determine which hosts to access in case a service request to a particular service is to be issued, and use the appropriate address and security credential in the service request when receiving an instruction to issue the service re quest. By periodically testing—out-of-band, i.e. at times when not instructed to issue service requests for the services in question—the connections to the servers, the communication device can determine which servers to preferably connect to in the future when receiving instructions to issue the service requests, and may also determine which security credentials to use based on the maintained list of security credentials.

Embodiments of the present invention may be realized in any of various forms. For example, in some embodiments, at least portions of the present invention may be realized as a computer-implemented method, a computer-readable memory medium, or a computer system. In other embodiments, at least portions of the present invention may be realized using one or more custom-designed hardware devices such as ASICs. In other embodiments, at least portions of the present invention may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. An apparatus comprising:
a processing element configured to cause a communication device to:
generate a request for a service, wherein the request comprises:
a service identifier corresponding to the service;
a network address previously obtained by the communication device and corresponding to a server associated with the service; and
a security credential for securely connecting to the server, wherein the security credential was negotiated and obtained by the communication device through a cryptographic handshake procedure performed between the device and the server during a previous communication of the communication device with the server to establish a trusted connection between the communication device and the server; and
transmit, via a network, the request for the service.

2. The apparatus of claim 1, wherein the processing element is further configured to cause the communication device to generate the service request in response to an application executing on the communication device.

3. The apparatus of claim 1, wherein the processing element is further configured to cause the communication device to transmit the request in a first packet and also transmit the request in a second packet.

4. The apparatus of claim 3, wherein the processing element is further configured to cause the communication device to transmit the request in the first packet according to a first communication protocol and transmit the request in the second packet according to a second communication protocol.

5. The apparatus of claim 4, wherein the processing element is further configured to cause the communication device to transmit the second packet within a predetermined period of time of transmitting the first packet.

6. The apparatus of claim 1, wherein the processing element is further configured to cause the communication device to receive the network address from a dedicated server prior to initiating a procedure for generating the request for the service.

7. The apparatus of claim 6, wherein the processing element is further configured to cause the communication device to receive the network address during a boot up procedure.

8. The apparatus of claim 7, wherein the processing element is further configured to cause the communication device to receive, during the boot up procedure, a plurality of network addresses corresponding to a plurality of servers associated with a plurality of services.

9. The apparatus of claim 8, wherein the plurality of network addresses represent a plurality of possible entry points for the service; and
wherein the processing element is further configured to cause the communication device to automatically fail over to using a different network address of the received plurality of network addresses to access the service when the communication device cannot access the service using a current network address of the received plurality of network addresses.

10. The apparatus of claim 1, wherein the processing element is further configured to cause the communication device to:
obtain a plurality of previously negotiated security credentials, wherein each respective previously negotiated security credential of the plurality of previously negotiated security credentials is indicative of a respective trusted relationship established between the communication device and a different corresponding server during a previous connection of the communication device to the corresponding server; and
determine which of the plurality of previously negotiated security credentials to include in the request for the service as the previously negotiated security credential, based at least in part on the previously determined network address included in the request for the service.

11. A non-volatile memory element storing instructions executable by a processing element to cause a communication device to:
obtain, prior to initiating an application requesting a service:
a network address corresponding to a server associated with the service; and
a security credential for securely connecting to the server, wherein the security credential was negotiated and obtained by the communication device through a cryptographic handshake procedure performed between the device and the server during a previous communication of the communication device with the server to establish a trusted connection between the communication device and the server;
receive, after initiating the application, an instruction to issue a service request; and
generate the service request in response to the instruction, wherein the service request comprises:
a service identifier corresponding to the service;
the obtained network address associated with the service; and
the obtained security credential for use in accessing the service; and
transmit, via a network, the service request to the server.

12. The non-volatile memory element of claim 11, wherein the instructions are further executable by the processing element to cause the communication device to:
obtain the network address and the security credential during a boot up procedure.

13. The non-volatile memory element of claim 11, wherein the instructions are further executable by the processing element to cause the communication device to:
obtain, prior to initiating the application requesting the service, one or more of the following:
a plurality of network addresses corresponding to a plurality of servers associated with a plurality of services; or
a plurality of previously negotiated security credentials for use in accessing the plurality of services, wherein each respective security credential of the plurality of previously negotiated security credentials is indicative of a respective trust established by the communication device and a different corresponding server of the plurality of servers during a previous connection of the communication device to the corresponding server.

14. The non-volatile memory element of claim 13, wherein the instructions are further executable by the processing element to cause the communication device to:
automatically fail over to using a different network address of the obtained plurality of network addresses to access the service if the communication device cannot access the service using a current network address of the obtained plurality network addresses.

15. The non-volatile memory element of claim 13, wherein the instructions are further executable by the processing element to cause the communication device to:
when obtaining the network address, select the network address from the plurality of network addresses based on respective latencies experienced during communications between the communication device and respective servers specified by network addresses, of the plurality of network addresses, associated with the service.

16. The non-volatile memory element of claim 13, wherein the instructions are further executable by the processing element to cause the communication device to:
when obtaining the network address, select the network address from the plurality of network addresses based on load-feedback information received from respective servers specified by network addresses, of the plurality of network addresses, associated with the service.

17. The non-volatile memory element of claim 11, wherein the instructions are further executable by the processing element to cause the communication device to:
transmit the request in each of a first packet and a second packet;
transmit the request in the first packet according to a first communication protocol and transmit the request in the second packet according to a different, second communication protocol; and
transmit the second packet within a predetermined period of time of transmitting the first packet.

18. A communication device comprising:
interface circuitry configured to enable communications of the communication device over at least one network; and
a processing element coupled to the interface circuitry and configured to interoperate with the interface circuitry to cause the communication device to:
receive, after initiating an application requesting a service, an instruction to issue a service request associated with the application; and
generate the service request in response to the instruction, wherein the service request comprises:
a service identifier corresponding to the service;
a network address previously obtained by the communication device and corresponding to a server associated with the service; and
a security credential for securely connecting to the server, wherein the security credential was negotiated and obtained by the communication device through a cryptographic handshake procedure performed between the device and the server during a previous communication of the communication device and the server to establish a trusted connection between the communication device and the server; and
transmit the service request, via a network, to the server associated with the service.

19. The communication device of claim 18, wherein the processing element is further configured to interoperate with the interface circuitry to cause the communication device to perform one or more of the following:
select the previously obtained network address from a plurality of previously obtained network addresses corresponding to respective servers associated with the service; or
select the previously obtained security credential from a plurality of previously obtained security credentials, based on a host accessed by the communication device inside the server.

20. The communication device of claim 18, wherein the processing element is further configured to interoperate with the interface circuitry to cause the communication device to:
obtain the network address corresponding to the server and the security credential for use in accessing the service from a dedicated server during initialization of the communication device.

* * * * *